(12) United States Patent
Kim et al.

(10) Patent No.: US 10,338,212 B2
(45) Date of Patent: Jul. 2, 2019

(54) GOLF SWING ANALYSIS APPARATUS AND METHOD

(71) Applicant: UCOMM TECHNOLOGY, CO., LTD., Anyang-si (KR)

(72) Inventors: Juno Kim, Seoul (KR); Sangil Jin, Seoul (KR); Hohyeong Lee, Seoul (KR); Hansu Nam, Bucheon-si (KR); Choongjin Lee, Guri-si (KR)

(73) Assignee: UCOMM TECHNOLOGY, CO., LTD., Anyang-si (KR)

( * ) Notice: Subject to any disclaimer, the term of this patent is extended or adjusted under 35 U.S.C. 154(b) by 373 days.

(21) Appl. No.: 15/120,152

(22) PCT Filed: Feb. 17, 2015

(86) PCT No.: PCT/KR2015/001602
§ 371 (c)(1),
(2) Date: Aug. 19, 2016

(87) PCT Pub. No.: WO2015/126142
PCT Pub. Date: Aug. 27, 2015

(65) Prior Publication Data
US 2017/0072261 A1 Mar. 16, 2017

(51) Int. Cl.
*G01S 7/04* (2006.01)
*G06K 9/00* (2006.01)
(Continued)

(52) U.S. Cl.
CPC .............. *G01S 13/88* (2013.01); *A63B 60/46* (2015.10); *A63B 69/3658* (2013.01); *G01S 7/04* (2013.01); *G01S 13/536* (2013.01); *G01S 13/583* (2013.01); *G06K 9/00342* (2013.01); *G09B 19/0038* (2013.01); *A63B 2220/31* (2013.01)

(58) Field of Classification Search
None
See application file for complete search history.

(56) References Cited

U.S. PATENT DOCUMENTS 4,824,107 A * 4/1989 French ............... A63B 24/0021
273/454
6,456,232 B1 * 9/2002 Milnes ............... A63B 24/0021
342/107

(Continued)

FOREIGN PATENT DOCUMENTS

| JP | 2012-052845 | 3/2012 |
| JP | 2013-176581 | 9/2013 |
| KR | 10-2002-0059562 | 7/2002 |

*Primary Examiner* — Vladimir Magloire
*Assistant Examiner* — Donald H B Braswell
(74) *Attorney, Agent, or Firm* — Lex IP Meister, PLLC

(57) ABSTRACT

An apparatus for analyzing a golf swing according to an exemplary embodiment of the present invention includes: a signal detecting unit including a Doppler radar sensor which radiates a transmission wave to a golf club and a golf ball and detects a reflected wave, in which a first reflected wave of the golf club and a second reflected wave of the golf ball are mixed, and detects a frequency deviation between the transmission wave and the mixed reflected wave and generates an output signal; and a swing analysis information calculating unit configured to calculate a speed of the golf club and a speed of the golf ball by using the output signal.

20 Claims, 14 Drawing Sheets

(51) Int. Cl.
　　　*A63B 60/46*　　　(2015.01)
　　　*A63B 69/36*　　　(2006.01)
　　　*G01S 13/58*　　　(2006.01)
　　　*G01S 13/88*　　　(2006.01)
　　　*G09B 19/00*　　　(2006.01)
　　　*G01S 13/536*　　 (2006.01)

(56) References Cited

U.S. PATENT DOCUMENTS

| | | | |
|---|---|---|---|
| 2004/0159153 | A1 | 8/2004 | Dilz, Jr. |
| 2011/0230985 | A1* | 9/2011 | Niegowski ............ A43B 3/0005 |
| | | | 700/91 |
| 2012/0302362 | A1 | 11/2012 | Ishii |
| 2014/0320334 | A1* | 10/2014 | Saegusa .................... G01S 7/04 |
| | | | 342/104 |
| 2015/0065268 | A1* | 3/2015 | Nakajima ............ A63B 37/006 |
| | | | 473/373 |
| 2016/0202353 | A1* | 7/2016 | Saegusa ................. G01S 13/58 |
| | | | 342/113 |
| 2017/0157480 | A1* | 6/2017 | Matsunaga ............ A63B 60/46 |

\* cited by examiner

GOLF SWING ANALYSIS APPARATUS AND METHOD

TECHNICAL FIELD

The present invention provides an apparatus and a method of analyzing a golf swing.

BACKGROUND ART

Golfers enjoy golf at an indoor driving range, such as a screen driving range, or an outdoor driving range, and a trajectory analyzing device for estimating a landing point of a golf ball is installed in the driving range. The trajectory analyzing device collects speed data of a golf ball and speed data of a golf club, and generates trajectory information of the golf ball based on the collected speed data of the golf ball and the collected speed data of the golf club. In order to collect the speed data of the golf ball and the speed data of the golf club, each data is collected by using a separate sensor.

As described above, there exists the apparatus which detects a speed of a golf ball and a speed of a golf club during a golf swing and notifies a user of analysis information about the golf swing, but it is impossible to provide various and accurate analysis information about the golf swing with one sensor. Further, the existing golf swing analyzing apparatus has a limitation in an installation place.

DISCLOSURE

Technical Problem

The present invention has been made in an effort to provide various analysis information of a golf swing with one sensor.

The present invention has also been made in an effort to provide accurate analysis information of a golf swing.

The present invention has also been made in an effort to improve user's usage convenience for a golf swing analyzing apparatus.

The present invention has also been made in an effort to increase a calculation speed of a golf swing analyzing apparatus.

In order to achieve other objects, which are not mentioned in detail, in addition to the above objects, exemplary embodiments according to the present invention may be used.

Technical Solution

An exemplary embodiment of the present invention provides an apparatus for analyzing a golf swing, including: a signal detecting unit including a Doppler radar sensor which radiates a transmission wave to a golf club and a golf ball and detects a reflected wave, in which a first reflected wave of the golf club and a second reflected wave of the golf ball are mixed, and detects a frequency deviation between the transmission wave and the mixed reflected wave and generates an output signal; and a swing analysis information calculating unit configured to calculate a speed of the golf club and a speed of the golf ball by using the output signal.

The number of Doppler radar sensors may be one.

The swing analysis information calculating unit may calculate the speed of the golf ball based on a signal, which is obtained by converting the output signal into a frequency region, and calculate the speed of the golf club based on a signal, which is generated from the output signal in a time region.

The swing analysis information calculating unit may include: a ball speed calculating unit configured to calculate the speed of the golf ball based on a frequency component obtained by converting the output signal into the frequency region, and a club speed calculating unit configured to calculate the speed of the golf club based on a zero-crossing frequency of the output signal.

The ball speed calculating unit may convert the output signal into the frequency region by performing Fast Fourier transform.

The ball speed calculating unit may calculate the speed of the golf ball based on the highest frequency value among frequency values of the obtained frequency components.

The highest frequency value may be the largest frequency value of the obtained frequency component, of which the size value is a predetermined value or more.

The club speed calculating unit may filter a signal for the zero-crossing frequency, and calculate the speed of the golf club based on a frequency value corresponding to the first peak of the filtered signal.

The first peak may be a point having the largest frequency value in the filtered signal.

The swing analysis information calculating unit may further include a practice swing determining unit, which determines a swing as a hitting swing when the speed of the golf ball has a predetermined value or more, and determines a swing as a practice swing when the speed of the golf ball has less than the predetermined value.

The practice swing determining unit may differently apply a predetermined value based on the kind of golf club.

The swing analysis information calculating unit may further include an accuracy calculating unit configured to calculate a smash factor based on a ratio of the speed of the golf club and the speed of the golf ball.

The swing analysis information calculating unit may further include a carry distance calculating unit configured to calculate a carry distance of the golf ball based on the speed of the golf ball, the kind of golf club, and the smash factor.

The swing analysis information calculating unit may further include a score managing unit configured to calculate a result score based on an error value between a preset target driving distance and the carry distance, and calculate a score sum by summing the calculated result score.

The apparatus for analyzing the golf swing may further include a signal pre-processing unit configured to remove noise of the output signal, convert an analog signal that is an output signal, in which the noise is removed, into a digital signal, and provide the swing analysis information calculating unit with the converted digital signal.

The apparatus for analyzing the golf swing may further include: a display unit configured to display swing analysis information calculated by the swing analysis information calculating unit; a memory unit configured to store the swing analysis information; and an input unit configured to receive a control signal including a signal setting the kind of golf club from a user.

The apparatus for analyzing the golf swing may further include a remote control unit configured to remotely transmit the control signal, in which the remote control unit may further include: a club selecting unit configured to set the kind of golf club; a display selecting unit configured to set swing analysis information displayed on the display unit; a target distance selecting unit configured to increase or decrease a target driving distance of the golf ball; a power-saving selecting unit configured to control power-saving of a main body of the golf swing analysis apparatus; and a mode selecting unit configured to convert a mode of the main body into an analysis mode.

The analysis mode may include a practice mode measuring a driving distance of the golf ball, a target mode setting a target driving distance of the golf ball and analyzing a swing, and a random mode randomly setting a target driving distance of the golf ball and analyzing a swing.

The apparatus for analyzing the golf swing may further include a voice guiding unit configured to output the swing analysis information with a voice.

Another exemplary embodiment of the present invention provides an apparatus for analyzing a golf swing, including: a signal detecting unit including a Doppler sensor which radiates a transmission wave to a golf club and a golf ball and detects a reflected wave by the golf club and the golf ball, and detects a frequency deviation between the transmission wave and the reflected wave and generates an output signal; a swing analysis information calculating unit configured to calculate a speed of the golf club and a speed of the golf ball by using the output signal, wherein the swing analysis information calculating unit includes a ball speed calculating unit configured to calculate the speed of the golf ball based on a frequency component obtained by converting the output signal into the frequency region, and a club speed calculating unit configured to calculate the speed of the golf club based on a zero-crossing frequency generated from the output signal in a time region.

The ball speed calculating unit may convert the output signal into the frequency region by performing Fast Fourier transform.

The ball speed calculating unit may calculate the speed of the golf ball based on the highest frequency value among frequency values of the obtained frequency components.

The highest frequency value may be the largest frequency value of the obtained frequency component, of which the size value is a predetermined value or more.

The club speed calculating unit may filter a signal for the zero-crossing frequency, and calculate the speed of the golf club based on a frequency value corresponding to the first peak of the filtered signal.

The first peak may be a point having the largest frequency value in the filtered signal.

Yet another exemplary embodiment of the present invention provides a method of analyzing a golf swing, including: radiating a transmission wave to a golf club and a golf ball and detecting a reflected wave, in which a first reflected wave of the golf club and a second reflected wave of the golf ball are mixed, and detecting a frequency deviation between the transmission wave and the mixed reflected wave and generating an output signal; calculating a speed of the golf club by using the output signal; and calculating a speed of the golf ball by using the output signal.

The calculating of the speed of the golf club may include: generating a signal for a zero-crossing frequency of the output signal; filtering a signal for the zero-crossing frequency; detecting the first peak of the filtered signal; and calculating the speed of the golf club based on a frequency value corresponding to the first peak.

A point having the largest frequency value in the filtered signal may be detected as the first peak.

The calculating of the speed of the golf club may include: converting the output signal into a frequency region and obtaining a frequency component; extracting a first frequency component having the highest frequency value from the frequency components; and calculating the speed of the golf ball based on a frequency value of the first frequency component.

The frequency component having the largest frequency value among the frequency components, of which size values are a predetermined value or more, may be extracted as the first frequency component.

Advantageous Effects

According to the exemplary embodiment of the present invention, it is possible to provide various analysis information of a golf swing with one sensor, and accurately provide analysis information about the golf swing, improve user's usage convenience of the golf swing analyzing apparatus, and increase a calculating speed of the golf swing analyzing apparatus.

MODE FOR INVENTION

Figure 1:
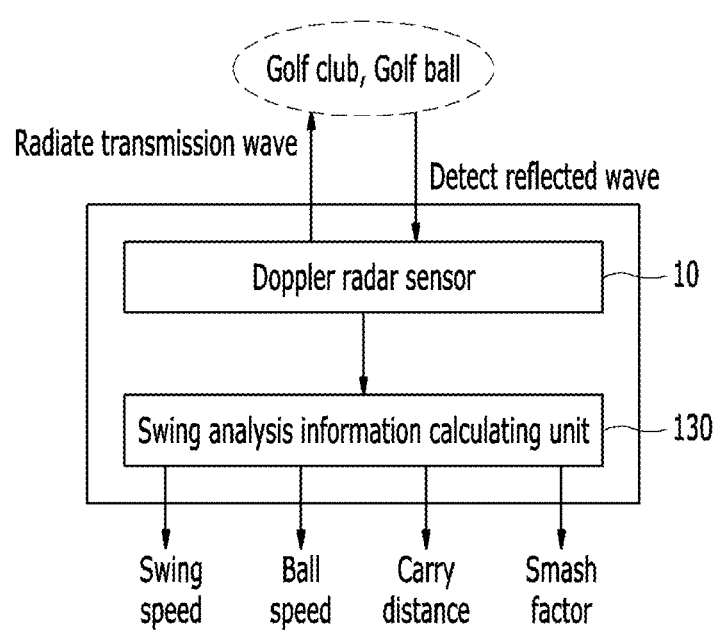
FIG. 1 is a schematic configuration diagram of a golf swing analyzing apparatus according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In order to apparently describe the present invention, a portion that does not relate to the description is omitted in the drawing, and like reference numerals designate like elements throughout the specification. In addition, the detailed description of the widely known technologies will be omitted.

Throughout the specification, unless explicitly described to the contrary, the word "comprise" and variations such as "comprises" or "comprising", will be understood to imply the inclusion of stated elements but not the exclusion of any other elements. Further, a term "~ unit" described in the specification means a unit processing at least one function or operation, and may be implemented by hardware, software, or a combination of hardware and software.

FIG. 1 is a schematic configuration diagram of a golf swing analyzing apparatus according to an exemplary embodiment of the present invention.

The golf swing analyzing apparatus according to the exemplary embodiment of the present invention may provide a user with various golf swing analysis information by calculating a speed of a golf club and a speed of a golf ball.

In order to calculate a speed of a golf club and a speed of a golf ball, the golf swing analyzing apparatus radiates a transmission wave to the golf club and the golf ball by using one Doppler radar sensor 10, and detects a reflected wave, in which a reflected wave of the golf club and a reflected wave of the golf ball are mixed. The Doppler radar sensor 10 detects a frequency deviation between the transmission wave and the mixed reflected wave and generates an output signal. The output signal generated by the Doppler radar sensor 10 is a signal, in which a signal related to the speed of the golf club and a signal related to the speed of the golf ball are mixed.

A swing analysis information calculating unit 130 calculates a swing speed of the golf club, a speed of the golf ball, a carry distance, and a smash factor representing accuracy of hitting by using the output signal generated by the Doppler radar sensor 10.

A user may recognize various his/her swing analysis information from the golf swing analyzing apparatus.

Figure 2:
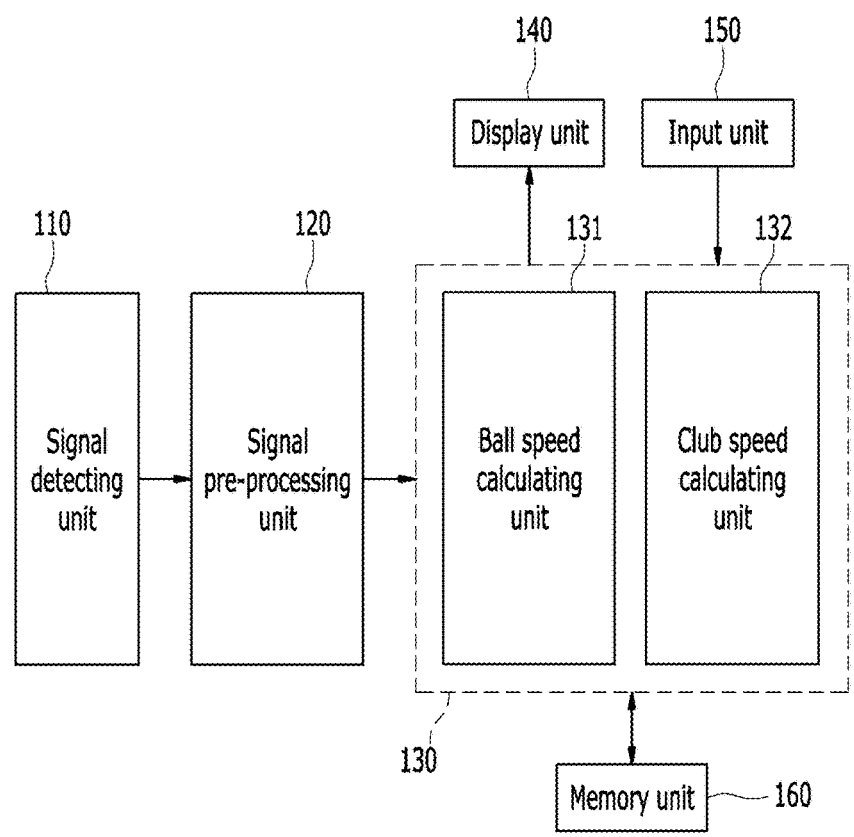
FIG. 2 is a block diagram of a golf swing analyzing apparatus according to a first exemplary embodiment of the present invention.
Figure 3:
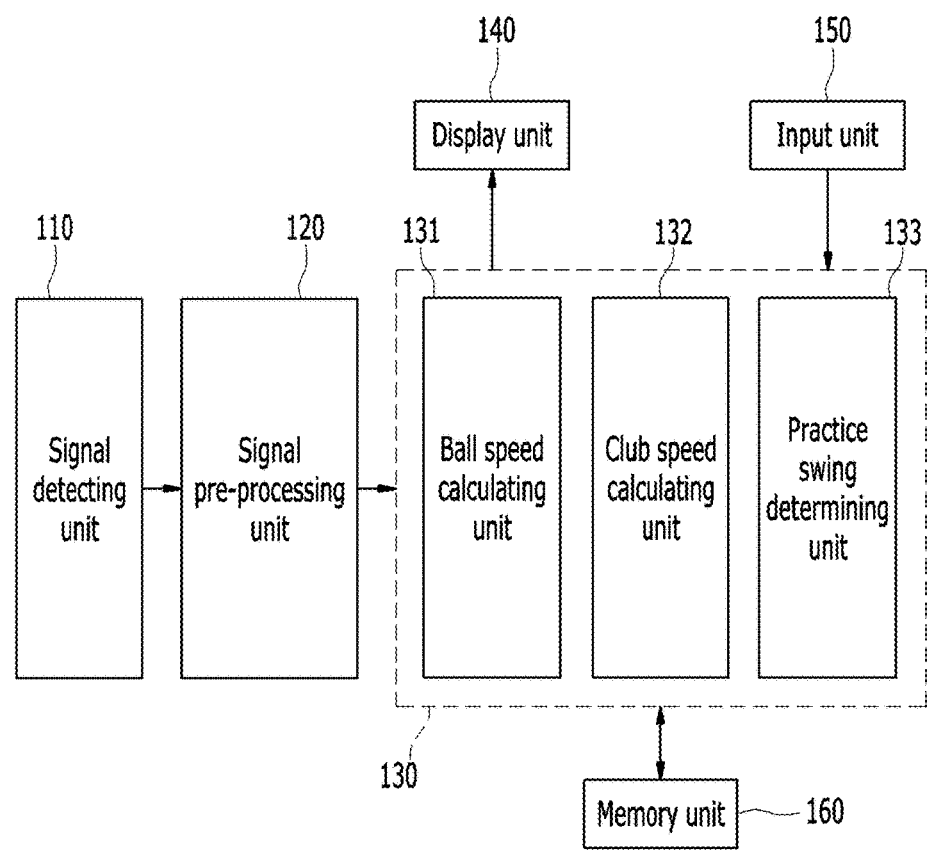
FIG. 3 is a block diagram of a golf swing analyzing apparatus according to a second exemplary embodiment of the present invention.
Figure 4:
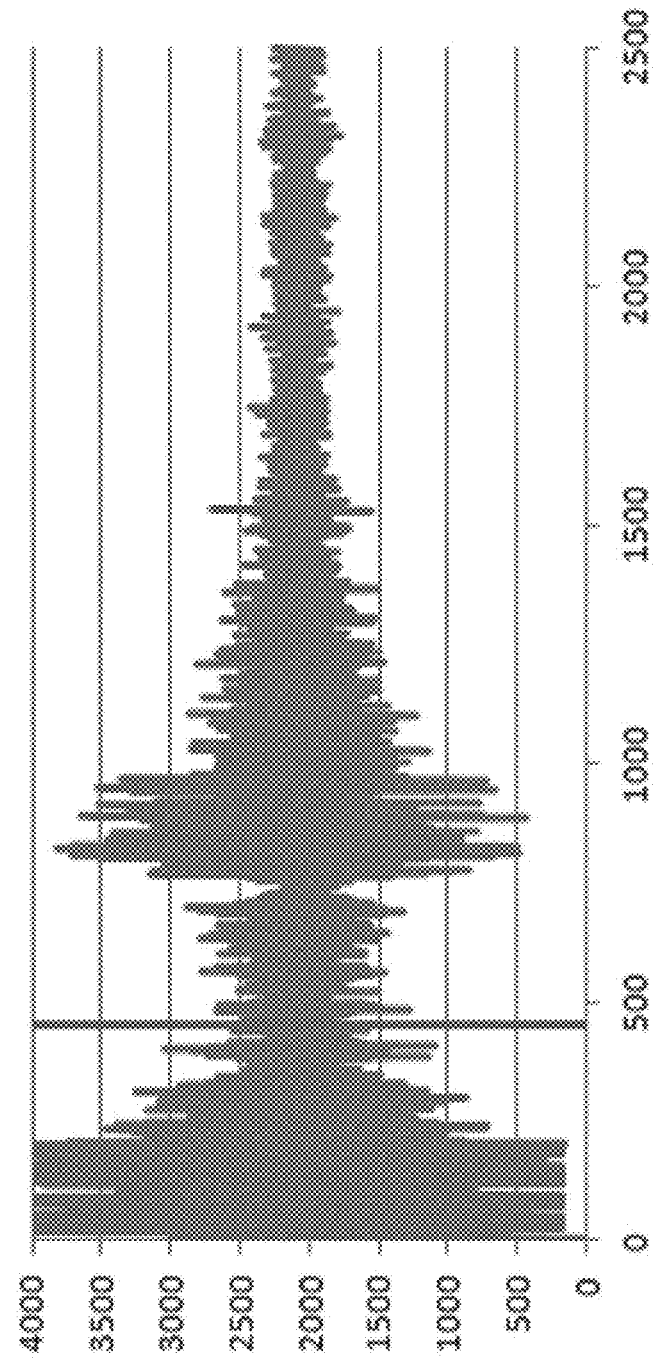
FIG. 4 is a diagram illustrating a waveform of a signal output from a Doppler radar sensor according to an exemplary embodiment of the present invention.
Figure 5:
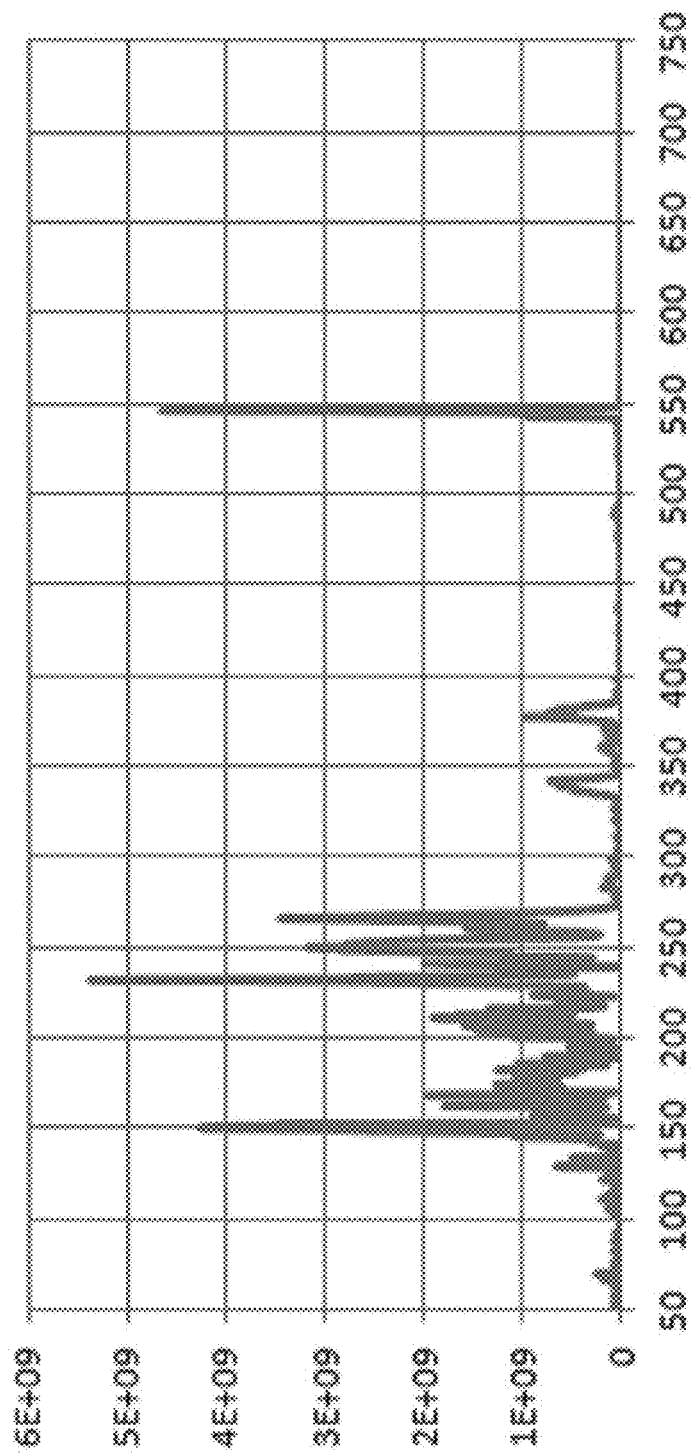
FIG. 5 is a diagram illustrating a result obtained by fast Fourier transforming a signal output from a Doppler radar sensor according to an exemplary embodiment of the present invention.
Figure 6:
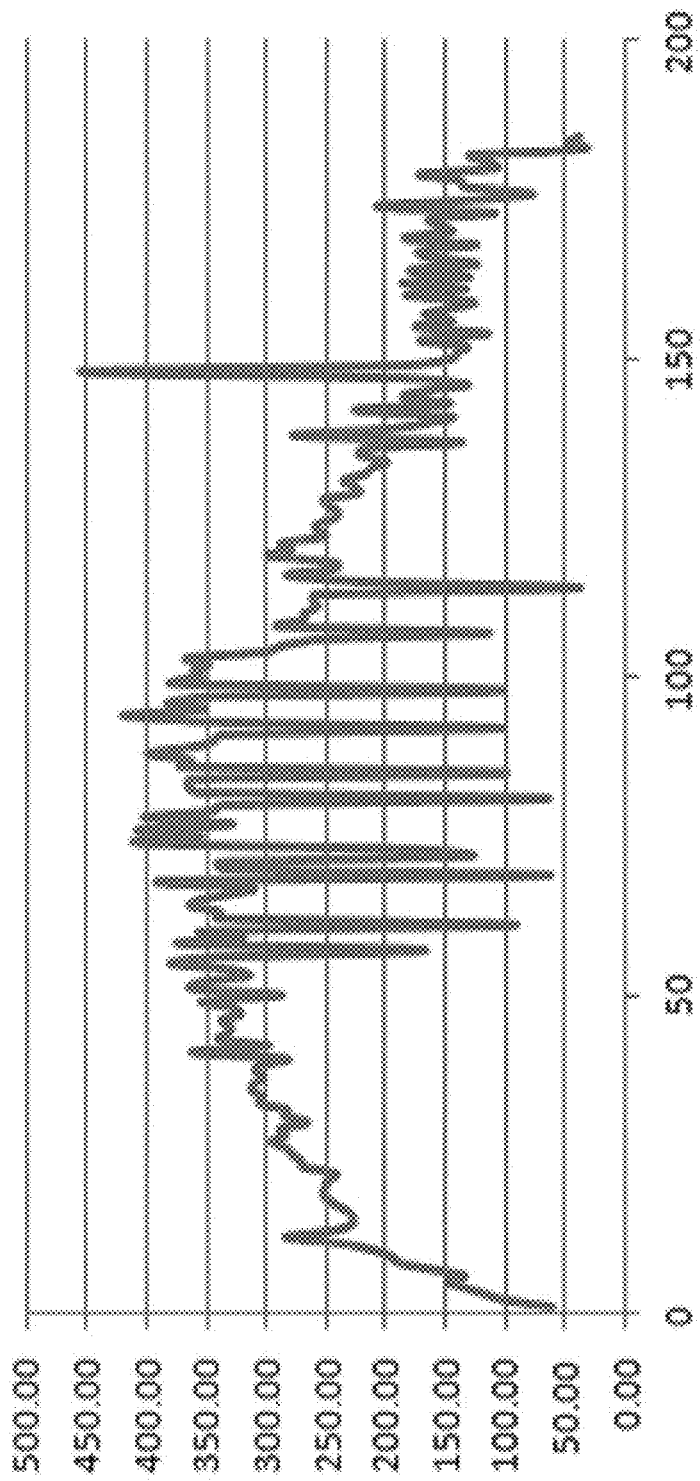
FIG. 6 is a diagram illustrating a signal for a zero-crossing frequency of a signal output from a Doppler radar sensor according to an exemplary embodiment of the present invention.
Figure 7:
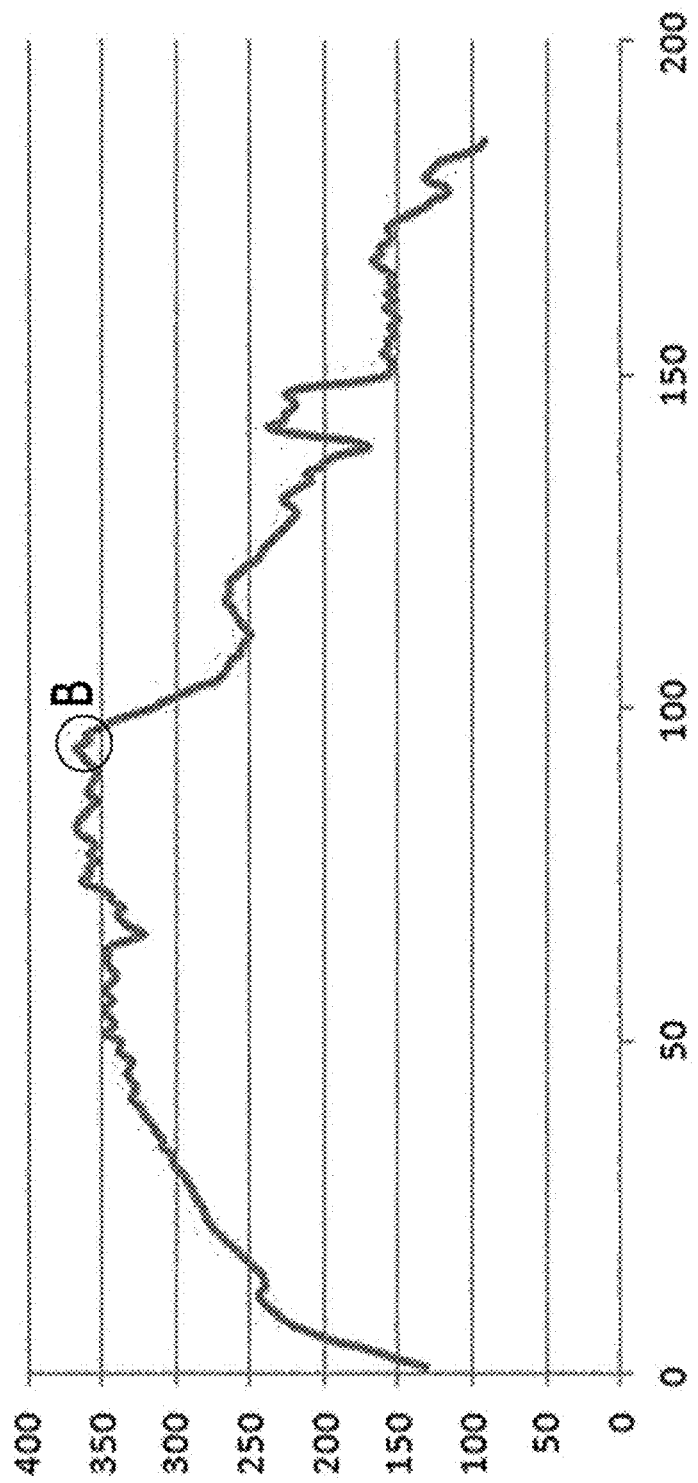
FIG. 7 is a graph representing a filtered signal for a zero-crossing frequency according to an exemplary embodiment of the present invention.

FIG. 2 is a block diagram of a golf swing analyzing apparatus according to a first exemplary embodiment of the present invention. FIG. 3 is a block diagram of a golf swing analyzing apparatus according to a second exemplary embodiment of the present invention. FIG. 4 is a diagram illustrating a waveform of a signal output from a Doppler radar sensor according to an exemplary embodiment of the present invention, and FIG. 5 is a diagram illustrating a result obtained by fast Fourier transforming a signal output from a Doppler radar sensor according to an exemplary embodiment of the present invention. FIG. 6 is a diagram illustrating a signal for a zero-crossing frequency of a signal output from a Doppler radar sensor according to an exemplary embodiment of the present invention, and FIG. 7 is a graph representing a filtered signal for a zero-crossing frequency according to an exemplary embodiment of the present invention.

The golf swing analyzing apparatus according to the first exemplary embodiment of the present invention illustrated in FIG. 2 includes a signal detecting unit 110, a signal pre-processing unit 120, a swing analysis information calculating unit 130, a display unit 140, an input unit 150, and a memory unit 160.

The signal detecting unit 110 radiates a transmission wave to a golf club and a golf ball by using a radar. The signal detecting unit 110 detects a reflected wave, in which a reflected wave of the golf club and a reflected wave of the golf ball are mixed, detects a frequency deviation between the transmission wave and the mixed reflected wave, and generates an output signal. For example, the signal detecting unit 110 may include a Doppler radar sensor 10 using the Doppler effect.

The output signal of the signal detecting unit 110 is a signal related to a speed of the golf club and a speed of the golf ball. A beam of the signal detecting unit 110 for detecting a speed of an object may be output with a beam width of 80° in a vertical direction (40° above and below based on a horizontal axis) and a beam width of 32° in a horizontal direction (16° left and right based on a vertical axis). The beam widths in the horizontal direction and the vertical direction mean ranges having an intensity of 50% of the largest intensity of the beam, and it is not that a beam does not exist at an angle beyond the beam width.

The golf swing analyzing apparatus may be installed to be slightly inclined in a rear direction when is installed on the ground, and a point, at which an outermost beam at a lower side in the vertical direction is in contact with the ground, may be a point spaced apart from a lower end of the golf swing analyzing apparatus by about 1 to 1.5 m.

The signal pre-processing unit 120 removes a noise of the output signal generated from the signal detecting unit 110, converts an analog signal that is the output signal, in which the noise is removed, into a digital signal, and provides the swing analysis information calculating unit 130 with the converted digital signal.

For example, the signal pre-processing unit 120 may provide the swing analysis information calculating unit 130 with the output signal illustrated in FIG. 4. A horizontal axis of FIG. 4 represents an index of a sample for the Fast Fourier Transform and a vertical axis represents a signal, in which signals related to a speed of a golf club and a speed of a golf ball are mixed, as a digital value.

According to the first exemplary embodiment of the present invention, it is described that the signal pre-processing unit 120 is separately present from the signal detecting unit 110, but the present invention is not limited thereto, and the signal detecting unit 110 may be designed to include a function of the signal pre-processing unit 120. Accordingly, the signal pre-processing unit 120 may be omitted.

The swing analysis information calculating unit 130 calculates a speed of the golf club and a speed of the golf ball by using the output signal of the signal detecting unit 110.

In order to calculate a speed of the golf club and a speed of the golf ball, the swing analysis information calculating unit 130 may include a ball speed calculating unit 131 and a club speed calculating unit 132.

The ball speed calculating unit 131 calculates a speed of the golf ball based on a frequency component obtained by converting the output signal of the signal detecting unit 110 into a frequency region. Since a speed of the golf ball is highest at the moment of hitting the golf ball by the user, the ball speed calculating unit 131 may calculate a speed of the golf ball by using the highest frequency value in the output signal of the signal detecting unit 110.

Equation 1 below is established between a speed of an object and a frequency measured by the Doppler radar sensor 10.

$$v = \frac{f_d C_0}{2F_0} \quad \text{(Equation 1)}$$

Here, v is a speed of an object, $f_d$ is a measured frequency, $C_0$ is a speed of light, and $F_0$ is a frequency of the Doppler radar sensor. A speed of light and a frequency of the Doppler radar sensor are constants, so that a speed of the object is proportional to a measured frequency. Accordingly, the ball speed calculating unit 131 may calculate a speed of the golf ball by using the highest frequency value in the output signal of the signal detecting unit 110.

For example, when $C_0$=299,782,458 m/s, $F_0$=24.125 GHz, a relation between a speed of an object and a measured frequency may be represented by Equation 2 below.

$$v = 0.0062133 \cdot f_d \quad \text{(Equation 2)}$$

The ball speed calculating unit 131 may calculate a speed of the golf ball by substituting a value of the highest frequency among the measured frequency components into Equation 2.

The ball speed calculating unit 131 may convert the output signal of the signal detecting unit 110 into a frequency region in order to detect a frequency component. For example, the ball speed calculating unit 131 may convert the output signal in a time region into a frequency region by using the Fast Fourier Transform in order to minimize a calculation time.

The ball speed calculating unit 131 may convert an output signal value of the time region illustrated in FIG. 4 into a signal value in a frequency region illustrated in FIG. 5 by performing the Fast Fourier Transform. A horizontal axis of FIG. 5 represents a speed, and a vertical axis represents a size value of a frequency component. Since the frequency value obtained by using the Fast Fourier Transform may be converted into a speed by using Equation 2, the horizontal axis of FIG. 5 may correspond to a frequency value.

50 in the horizontal axis of FIG. 5 represents 5 m/s, and 550 represents 55 m/s. The ball speed calculating unit 131 may calculate a speed of the golf ball as 55 m/s in FIG. 5.

In order to detect the highest frequency component, the ball speed calculating unit 131 may detect frequency components, of which size values of a frequency have a predetermined value or more, in the samples of the frequency components obtained through the Fast Fourier Transform. The ball speed calculating unit 131 may detect the largest frequency value of the frequency component, of which the size value has the predetermined value or more, as the highest frequency value.

For example, the ball speed calculating unit 131 observes a size value of a frequency component of a sample in a direction from a high frequency to a low frequency, and when the size value of the frequency component of the sample is two times or more of an average size of the frequency components of the total samples, the ball speed calculating unit 131 may record the frequency component of the corresponding sample as a first frequency component. Then, when the size values of the frequency components of the 20 samples has the size value of the first frequency component or less, the ball speed calculating unit 131 may determine the first frequency component as the frequency component having the largest frequency value. Further, when the size value of the frequency component of the sample is 30% or less of the size value of the first frequency component or less after the first frequency component, the ball speed calculating unit 131 may determine the first frequency component as the highest frequency component.

The club speed calculating unit 132 generates a signal for a zero-crossing frequency of the output signal of the signal detecting unit 110, and calculates a speed of the golf club based on the generated zero-crossing frequency. The zero-crossing frequency is a value generated in a time region, not a value generated by converting the output signal of the signal detecting unit 110 into a frequency region.

The club speed calculating unit 132 generates a signal for a zero-crossing frequency of the output signal of the signal detecting unit 110 to obtain the graph of FIG. 6. In the graph of FIG. 6, a value of the output signal of the signal detecting unit 110 may be converted into a square wave signal formed of values of −1 and 1, and a value of the zero-crossing frequency may be calculated and generated with a reciprocal of a time interval shifted from −1 to 1 or 1 to −1. Particularly, an analog circuit is configured so that a case where a value of the output signal of the signal detecting unit 110 is larger than a predetermined value is 1, and a case where the value of the output signal of the signal detecting unit 110 is smaller than the predetermined value is −1, and then a value of the zero-crossing frequency may be calculated with a reciprocal of a time interval shifted from −1 to 1 or 1 to −1. A horizontal axis of FIG. 6 represents an index of a sample, and a vertical axis represents a value obtained by converting a zero-crossing frequency value into a speed value. A zero-crossing frequency value means a frequency, so that a zero-crossing frequency value may be converted into a speed by using Equation 2. 50.00 in the vertical axis of FIG. 6 is 5 m/s, and 500.00 is 50 m/s.

The club speed calculating unit 132 may filter a signal for the zero-crossing frequency of FIG. 6 in order to extract a zero-crossing frequency value representing a movement of only the golf club. The signal for the zero-crossing frequency of FIG. 6 may be filtered as illustrated in FIG. 7.

The club speed calculating unit 132 may calculate a speed of the golf club by detecting the first peak of the signal for the zero-crossing frequency filtered as illustrated in FIG. 7. Since the speed of the golf club is decreased after the golf club hits the golf ball, the club speed calculating unit 132 may detect a point having the largest frequency value in the filtered signal as the first peak and determine the speed of the golf club For example, the club speed calculating unit 132 may detect B of FIG. 7 as the first peak. The club speed calculating unit 132 may calculate about 36 m/s that is a speed corresponding to B as the speed of the golf club.

For example, the club speed calculating unit 132 may compare a size of the frequency value of the filtered signal in chronological order and record a frequency value having a larger value than that of a previous time. When the size of the frequency value of the filtered signal after the record of the value is decreased to 90% or less of the size of the recorded frequency value, the club speed calculating unit 132 may detect a point having the recorded frequency value as the first peak. Further, when the size of the recorded frequency value is larger than the sizes of the frequency values of the 20 samples after the recording of the value, the club speed calculating unit 132 may detect a point having the recorded frequency value as the first peak.

The display unit 140 displays the swing analysis information calculated in the swing analysis information calculating unit 130. For example, the display unit 140 may display the speed of the golf club, the speed of the golf ball, the carry distance, a smash factor, and the like calculated by the swing analysis information calculating unit 130.

The swing analysis information may be visually displayed through the display unit 140, and may be output through a voice through a separate voice guiding unit (not illustrated).

The input unit 150 receives a control signal including a signal setting the kind of golf club from a user. The user may input a signal setting the kind of golf club, a signal setting a mode of a golf swing simulation, a signal setting a target driving distance, and the like by using the input unit 150.

The memory unit 160 stores the swing analysis information calculated in the swing analysis information calculating unit 130. The swing analysis information calculating unit 130 may calculate swing analysis information by using the information stored in the memory unit 160.

The golf swing analyzing apparatus according to the first exemplary embodiment of the present invention may calculate a speed of a golf club and a speed of a golf ball by using one Doppler radar sensor 10 with low costs. Further, the golf swing analyzing apparatus may accurately calculate a speed of a golf club and a speed of a golf ball. Further, the golf swing analyzing apparatus may calculate a speed of a golf club without converting an output signal of the Doppler radar sensor 10 into a frequency region, thereby decreasing a calculation speed.

Next, a golf swing analyzing apparatus according to a second exemplary embodiment of the present invention will be described with reference to FIG. 3. The golf swing analyzing apparatus of FIG. 3 is the same as the golf swing analyzing apparatus of FIG. 2, but is different from the golf swing analyzing apparatus of FIG. 2 in that the swing analysis information calculating unit 130 further includes a practice swing determining unit 133.

The practice swing determining unit 133 determines whether a swing is a practice swing based on a speed of a golf ball calculated by a ball speed calculating unit 131. When the speed of the golf ball is a predetermined value or more, the practice swing determining unit 133 may determine that the swing is a hitting swing, and when the speed of the golf ball is less than the predetermined value, the practice swing determining unit 133 may determine that the swing is a practice swing. For example, when the speed of the golf ball is 0 m/s or more, the practice swing determining unit 133 may determine that the swing is a hitting swing, and when the speed of the golf ball is less than 0 m/s, the practice swing determining unit 133 may determine that the swing is a practice swing.

The practice swing determining unit 133 may differently apply the predetermined value based on the kind of golf club. For example, in a case of a golf club having a long driving distance, the practice swing determining unit 133 may determine whether a swing is a practice swing by setting the predetermined value to be large, and in a case of a golf club having a short driving distance, the practice swing determining unit 133 may determine whether a swing is a practice swing by setting the predetermined value to be small.

The golf swing analyzing apparatus according to the second exemplary embodiment of the present invention may precisely determine whether a swing is a practice swing by determining whether the swing is the practice swing based on a speed of a golf ball and the kind of golf club.

Hereinafter, a golf swing analyzing apparatus according to a third exemplary embodiment of the present invention will be described with reference to FIG. 8.

Figure 8:
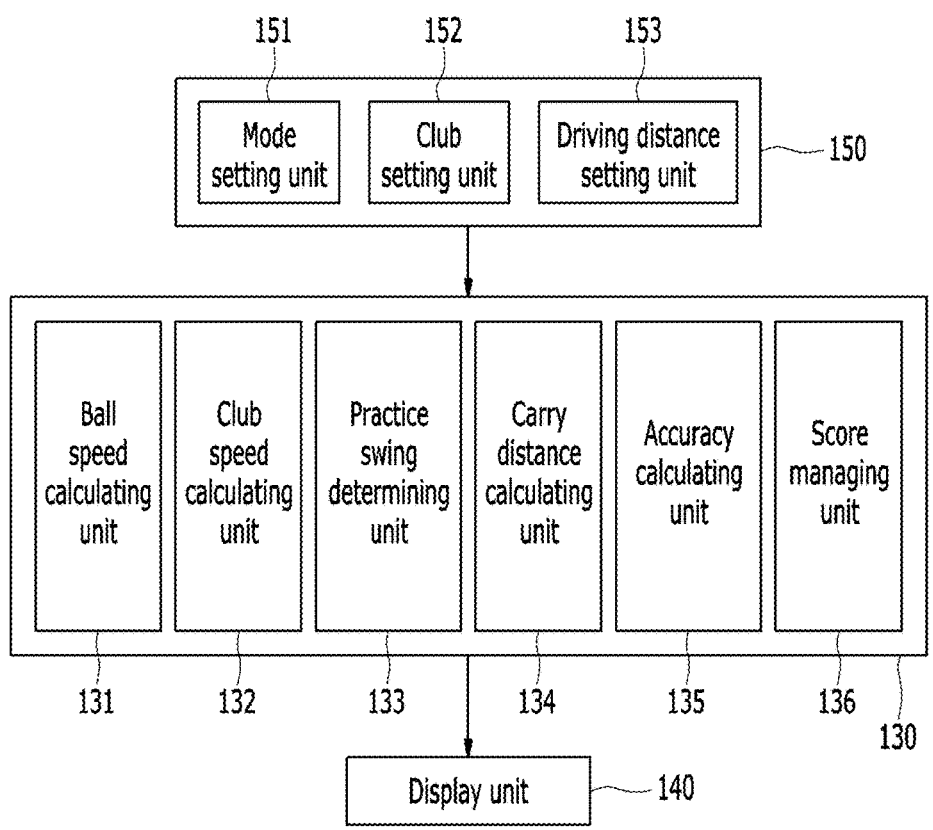
FIG. 8 is a block diagram of an input unit and a swing analysis information calculating unit of a golf swing analyzing apparatus according to a third exemplary embodiment of the present invention.

FIG. 8 is a detailed block diagram of an input unit and a swing analysis information calculating unit of the golf swing analyzing apparatus according to the third exemplary embodiment of the present invention.

The swing analysis information calculating unit 130 may include a ball speed calculating unit 131, a club speed calculating unit 132, a practice swing determining unit 133, a carry distance calculating unit 134, an accuracy calculating unit 135, and a score managing unit 136. The ball speed calculating unit 131, the club speed calculating unit 132, and the practice swing determining unit 133 of FIG. 8 perform the same functions as those of the golf swing analyzing apparatus according to the second exemplary embodiment of the present invention illustrated in FIG. 3.

The carry distance calculating unit 134 may calculate a carry distance of the golf ball based on the speed of the golf ball calculated by the ball speed calculating unit 131 and the kind of golf club which is received from the user and is set. For example, when the user sets the kind of golf club as a six iron through the club setting unit 152 of the input unit 150, the carry distance calculating unit 134 may calculate a carry distance by using the speed of the golf ball calculated by the ball speed calculating unit 131 and 30° that is an angle corresponding to the six iron.

The accuracy calculating unit 135 may calculate a smash factor based on the speed of the golf club calculated by the club speed calculating unit 132 and the speed of the golf ball calculated by the ball speed calculating unit 131.

The smash factor is defined with a ratio of a speed of a golf ball to a speed of a golf club, and expresses how close the golf ball hits a sweet spot of the golf club with a numerical value, and represents repulsive power. The user may determine whether the golf ball hits the sweet spot by confirming the smash factor calculated by the accuracy calculating unit 135.

The carry distance calculating unit 134 may calculate a carry distance of the golf ball based on the speed of the golf ball, the kind of golf club, and the smash factor calculated by the accuracy calculating unit 135. For example, the carry distance calculating unit 134 may calculate a carry distance of the golf ball by reflecting the smash factor calculated by the accuracy calculating unit 135 based on a smash factor in a case where the golf ball hits the sweet spot. When the smash factor calculated by the accuracy calculating unit 135 is smaller than the smash factor in the case where the golf ball hits the sweet spot, the carry distance calculating unit 134 may adjust the calculated carry distance to be short by using the angle based on the kind of golf club and the speed of the golf ball. The smash factor in the case where the golf ball hits the sweet spot may be different depending on the kind of golf club.

Further, the carry distance calculating unit 134 may store the speed of the golf ball, the kind of golf club, and the value of the carry distance corresponding to the smash factor in the memory unit 160, and may calculate a carry distance by using the value of the carry distance stored in the memory unit 160. For example, when the speed of the golf ball is 40 m/s, the golf club is the six iron, and the smash factor is 1.3, the carry distance calculating unit 134 may calculate a carry distance as 80 m by using a pre-stored value.

The score managing unit 136 may calculate a result score based on an error value between a preset target driving distance and the carry distance. The score managing unit 136 may calculate a score sum by adding the calculated result scores. For example, the score managing unit 136 may calculate a result score based on an error value between a target driving distance input through the driving distance setting unit 153 of the input unit 150 by the user and the carry distance calculated by the carry distance calculating unit 134. As the error between the target driving distance and the carry distance is small, the score managing unit 136 may calculate a result score with a large value. The score managing unit 136 may calculate a score sum by adding a result score calculated for each shot.

The user may set various golf swing simulation modes through the mode setting unit 151 of the input unit 150. For example, when the user sets the golf swing simulation mode with a first mode, a practice mode may be executed. In a case of the practice mode, the user may freely perform a swing practice, and the golf swing analyzing apparatus may calculate a carry distance and a smash factor and provide the user with the calculated carry distance and smash factor.

When the user sets the golf swing simulation mode with a second mode, a target mode may be executed. In a case of the target mode, the user may directly set a target driving distance, and the golf swing analyzing apparatus may provide the user with a result score based on an error value between the target driving distance set by the user and an actual carry distance.

When the user sets the golf swing simulation mode with a third mode, a random mode may be executed. In a case of the random mode, even though the user directly sets a target driving distance, a target driving distance may be randomly set in the golf swing simulation. In the random mode, the target driving distance is changed after the user performs the shot, so that the user may perform a golf practice based on a target driving distance which is different for each shot.

A golf swing analyzing apparatus according to a third exemplary embodiment of the present invention may provide a user with various simulation modes to enable the user to have interests in a golf swing practice. Further, the golf swing analyzing apparatus may provide the user with various golf swing analysis information.

Hereinafter, a golf swing analyzing apparatus according to a fourth exemplary embodiment of the present invention will be described with reference to FIGS. 9 to 11.

Figure 9:
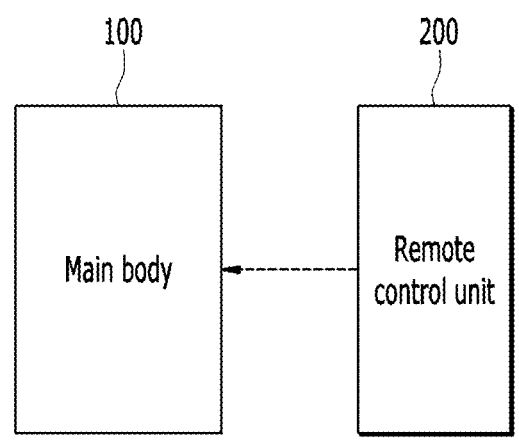
FIG. 9 is a brief block diagram of a golf swing analyzing apparatus including a remote control unit according to a fourth exemplary embodiment of the present invention.
Figure 10:
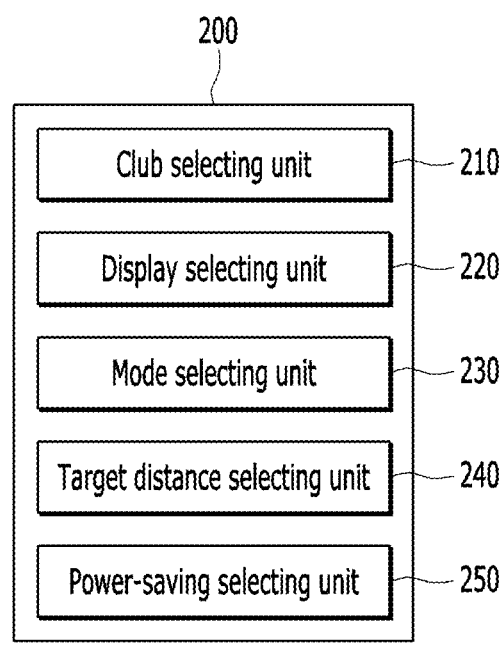
FIG. 10 is a block diagram of a remote control unit according to a fourth exemplary embodiment of the present invention.
Figure 11:
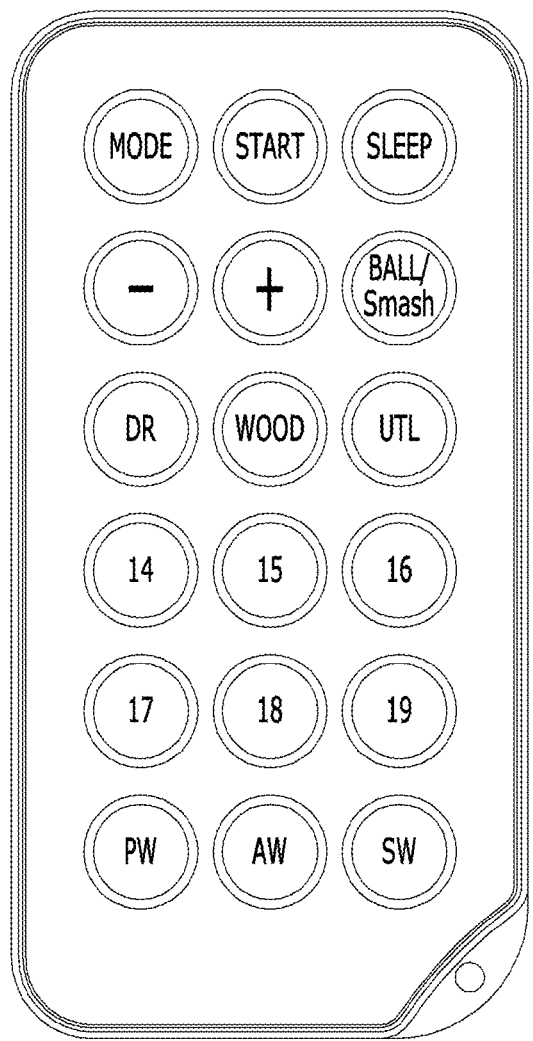
FIG. 11 is a front view of the remote control unit according to the fourth exemplary embodiment of the present invention.

FIG. 9 is a brief block diagram of a golf swing analyzing apparatus including a remote control unit according to a fourth exemplary embodiment of the present invention, FIG. 10 is a block diagram of a remote control unit according to a fourth exemplary embodiment of the present invention, and FIG. 11 is a front view of the remote control unit according to the fourth exemplary embodiment of the present invention.

The remote control unit 200 may remotely input an input signal to the golf swing analyzing apparatus in order to provide usage convenience of the golf swing analyzing apparatus. The remote control unit 200 may be implemented with a wireless remote controller, and may remotely transmit signals for various function settings, such as setting of a golf club, to a main body 100 through IR communication. In addition to the IR communication, the setting signal may be transmitted to the main body 100 through a near field communication means, such as Bluetooth, WiFi, and ZigBee.

The main body 100 may be the golf swing analyzing apparatus described in the first exemplary embodiment and the third exemplary embodiment, and is not limited thereto, and may be an apparatus providing various analysis information about a golf swing.

Since the main body 100 is installed while being spaced apart from a golfer performing a swing by a predetermined distance in order to measure a speed of a golf ball and a speed of a golf club, when the remote control unit 200 controlling the main body 100 is not present, the user needs to frequently move during the golf swing in order to control the main body 100. Accordingly, the golf swing analyzing apparatus including the remote control unit 200, such as a remote controller, may provide convenience to the user in operating the corresponding apparatus.

The remote control unit 200 may include a club selecting unit 210, a display selecting unit 220, a mode selecting unit 230, a target distance selecting unit 240, and a power-saving selecting mode 250.

The club selecting unit 210 may select the kind of golf club. The club selecting unit 210 may include a club type selecting unit selecting the type of club, and a club size selecting unit selecting a size of club. For example, as illustrated in FIG. 11, a driver select button DR, a wood select button WOOD, and a utility select button UTL are disposed in the remote control unit 200, and when the user clicks the wood select button WOOD several times, a wood size may be changed. There are many cases where an iron is actually selected by a golfer in a golf swing practice, so that a button, such as 17 and 14 illustrated in FIG. 11, in which a size of golf club and the type of golf club are written, may be used. In FIG. 11, selections of a size of golf club and the type of golf club are mixed due to a limit in size of a remote controller, but a selection of the type of golf club and a selection of a size of golf club and may be performed through separate buttons.

The display selecting unit 220 may display any one of a movement speed of the hit golf ball or the smash factor of the golf ball. The main body 100 may calculate a movement speed of the golf ball at a collision moment of the golf ball and the golf club, and may simultaneously calculate a smash factor about whether an optimum hitting is performed. The display selecting unit 220 included in the remote control unit 200 may be implemented by a button written with Ball/Smash, and a display of the display unit 140 of the main body 100 may be switched by clicking the corresponding button.

The mode selecting unit 230 may switch a mode of the main body 100 to a specific analysis mode. The analysis mode may be any one of a practice mode measuring a driving distance of a golf ball, a target mode analyzing a swing after a user directly sets a target driving distance of a golf ball, and a random mode analyzing a swing after a target driving distance of a golf ball is randomly set. A golfer may remotely change a golf swing analysis mode through the mode selecting unit 230 of the remote control unit 200, and may improve interests in a golf swing practice.

The target distance selecting unit 240 may increase/decrease a target driving distance of the golf ball. The target distance selecting unit 240 may serve to adjust the target driving distance in the target mode or the random mode having the target driving distance. As illustrated in FIG. 11, the target distance selecting unit 240 may be formed of a button indicated with a plus (+) or minus (−) sign.

The power-saving selecting unit 120 may control power-saving of the main body 100. The golf swing analyzing apparatus may be manufactured in a size so as for a golfer to usually carry the golf swing analyzing apparatus, and a chargeable small battery is detachably embedded in the golf swing analyzing apparatus. However, the golf swing analyzing apparatus may be held with a predetermined distance from a swing position of the golfer and needs to have the display unit 140 having a predetermined size or more, so that the amount of power consumed of the golf swing analyzing apparatus may be large. Accordingly, the remote control unit 200 includes the power-saving selecting unit 250 and switches a state of the main body 100 to a standby power state, thereby preventing power consumption of an embedded power source and increasing hours of use.

A golf swing analyzing apparatus according to a fourth exemplary embodiment of the present invention may provide a user with convenience of an operation of the golf swing analyzing apparatus.

Hereinafter, a golf swing analyzing method according to an exemplary embodiment of the present invention will be described with reference to FIGS. 12 to 14. Contents overlapping the contents described in the golf swing analyzing apparatus may be omitted.

Figure 12:
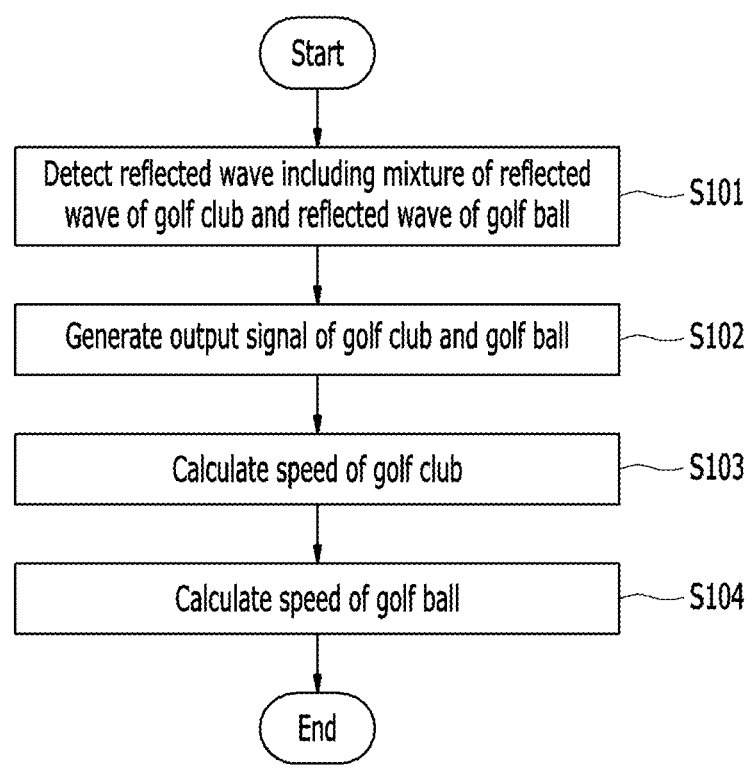
FIG. 12 is a flowchart of a golf swing analyzing method according to an exemplary embodiment of the present invention.
Figure 13:
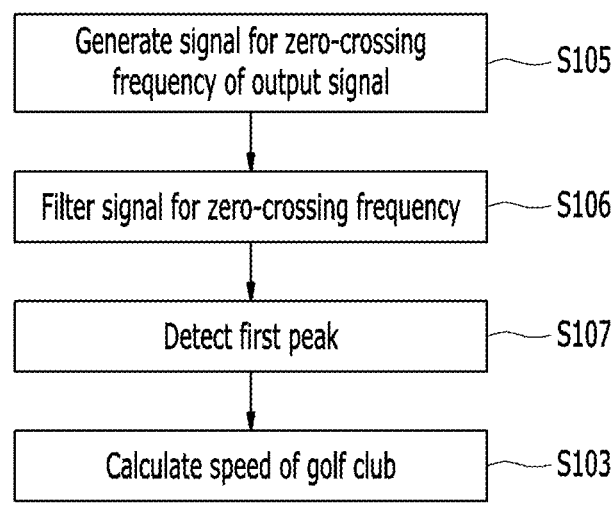
FIG. 13 is a flowchart of a method of calculating a speed of a golf club according to an exemplary embodiment of the present invention.
Figure 14:
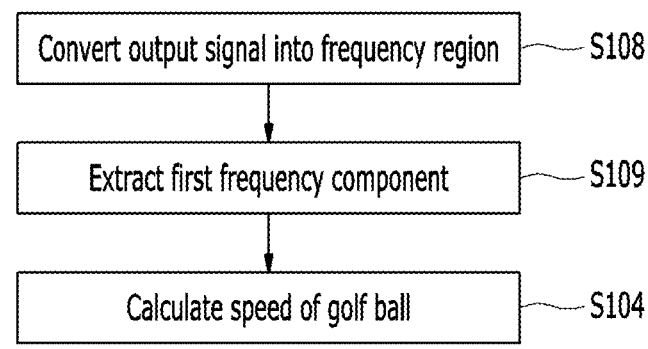
FIG. 14 is a flowchart of a method of calculating a speed of a golf ball according to an exemplary embodiment of the present invention.

FIG. 12 is a flowchart of a golf swing analyzing method according to an exemplary embodiment of the present invention FIG. 13 is a flowchart of a method of calculating a speed of a golf club according to an exemplary embodiment of the present invention, and FIG. 14 is a flowchart of a method of calculating a speed of a golf ball according to an exemplary embodiment of the present invention.

The golf swing analyzing apparatus radiates a transmission wave to a golf club and a golf ball, and detects a reflected wave, in which a reflected wave of the golf club and a reflected wave of the golf ball are mixed (S101). Further, the golf swing analyzing apparatus generates an output signal by detecting a frequency deviation between the transmission wave and the mixed reflected wave (S102). The golf swing analyzing apparatus calculates a speed of the golf club by using the generated output signal (S103), and calculates a speed of the golf ball (S104). A sequence of the calculation of the speed of the golf club and the calculation of the speed of the golf ball is not limited to FIG. 12, and the speed of the golf ball may be first calculated.

In operation S103 of calculating the speed of the golf club, the speed of the golf club may be calculated in a process of FIG. 13.

The golf swing analyzing apparatus generates a signal for a zero-crossing frequency of the output signal (S105), and filters the generated signal for the zero-crossing frequency (S106). Further, the golf swing analyzing apparatus detects the first peak of the filtered signal (S107), and calculates a speed of the golf club based on a frequency value corresponding to the first peak (S103).

The golf swing analyzing apparatus may detect the first peak with a point having the largest frequency value in the filtered signal.

The golf swing analyzing apparatus converts the output signal into a frequency region, and obtains a frequency component (S108). The golf swing analyzing apparatus extracts a frequency component having the highest frequency value among the frequency components (S109), and calculates a speed of the golf ball based on a frequency value of the extracted frequency component (S104).

The golf swing analyzing apparatus may extract a frequency component having the largest frequency value among the frequency components, of which size values have a predetermined value or more, as a frequency component having the highest frequency value.

In the above, the exemplary embodiment of the present invention, which calculates a speed of a golf club and a speed of a golf ball by using one Doppler radar sensor 10, has been described, but the present invention is not limited thereto.

A golf swing analyzing apparatus according to a fifth exemplary embodiment of the present invention may radiate a transmission wave to a golf club and a golf ball and detect a reflected wave by the golf club and the golf ball, and detect a frequency deviation between the transmission wave and the reflected wave and generate an output signal. The golf swing analyzing apparatus may detect the reflected wave of the golf club and the reflected wave of the golf ball by using a plurality of Doppler radar sensors 10. The golf swing analyzing apparatus may calculate the speed of the golf club based on a zero-crossing frequency generated from an output signal in a time region. Further, the golf swing analyzing apparatus may convert the output signal into a frequency region and calculate the speed of the golf ball based on the obtained frequency component. Accordingly, since the golf swing analyzing apparatus calculates the speed of the golf club without converting the output signal into the frequency region, thereby having a high calculation speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for analyzing a golf swing, comprising:
a signal detecting unit including a Doppler radar sensor which radiates a transmission wave to a golf club and a golf ball and detects a reflected wave, in which a first reflected wave of the golf club and a second reflected wave of the golf ball are mixed, and detects a frequency deviation between the transmission wave and the mixed reflected wave and generates an output signal; and
a swing analysis information calculating unit configured to calculate a speed of the golf club and a speed of the golf ball by using the output signal,
wherein:
the swing analysis information calculating unit calculates the speed of the golf ball based on a signal, which is obtained by converting the output signal into a frequency domain, and calculates the speed of the golf club based on a signal, which is generated from the output signal in a time domain, and
wherein: the swing analysis information calculating unit further includes a practice swing determining unit, which determines a swing as a hitting swing when the candidate speed of the golf ball has a predetermined value or more, and determines a swing as a practice swing when the candidate speed of the golf ball has less than the predetermined value, and
wherein: the practice swing determining unit differently applies the predetermined value based on the kind of golf club.

2. The apparatus of claim 1, wherein:
the number of Doppler radar sensors is one.

3. The apparatus of claim 1, wherein:
the swing analysis information calculating unit includes:
a ball speed calculating unit configured to calculate a candidate speed of the golf ball based on a frequency component obtained by converting the output signal into the frequency domain, and
a club speed calculating unit configured to calculate the speed of the golf club based on a zero-crossing frequency of the output signal.

4. The apparatus of claim 3, wherein:
the ball speed calculating unit converts the output signal into the frequency domain by performing fast Fourier transform.

5. The apparatus of claim 4, wherein:
the ball speed calculating unit calculates the candidate speed of the golf ball based on the highest frequency value among frequency values of the obtained frequency components.

6. The apparatus of claim 5, wherein:
the highest frequency value is the largest frequency value of the obtained frequency component, of which the size value has a predetermined value or more.

7. The apparatus of claim 3, wherein:
the club speed calculating unit filters a signal for the zero-crossing frequency, and calculates the speed of the golf club based on a frequency value corresponding to a peak of the filtered signal.

8. The apparatus of claim 7, wherein:
the peak is a point having the largest frequency value in the filtered signal.

9. The apparatus of claim 3, wherein:
the swing analysis information calculating unit further includes
an accuracy calculating unit configured to calculate a smash factor based on a ratio of the speed of the golf club and the candidate speed of the golf ball.

10. The apparatus of claim 9, wherein:
the swing analysis information calculating unit further includes
a carry distance calculating unit configured to calculate a carry distance of the golf ball based on the candidate speed of the golf ball, the kind of golf club, and the smash factor.

11. The apparatus of claim 10, wherein:
the swing analysis information calculating unit further includes
a score managing unit configured to calculate a result score based on an error value between a preset target driving distance and the carry distance, and calculate a score sum by summing the calculated result score.

12. The apparatus of claim 1, further comprising:
a signal pre-processing unit configured to remove noise of the output signal, convert an analog signal that is an output signal, in which the noise is removed, into a digital signal, and provide the swing analysis information calculating unit with the converted digital signal.

13. The apparatus of claim 12, further comprising:
a display unit configured to display swing analysis information calculated by the swing analysis information calculating unit;
a memory unit configured to store the swing analysis information; and
an input unit configured to receive a control signal including a signal setting the kind of golf club from a user.

14. The apparatus of claim 13, further comprising:
a remote control unit configured to remotely transmit the control signal,
wherein the remote control unit includes:
a club selecting unit configured to set the kind of golf club;
a display selecting unit configured to set swing analysis information displayed on the display unit;
a target distance selecting unit configured to increase or decrease a target driving distance of the golf ball;
a power-saving selecting unit configured to control power-saving of a main body of the golf swing analysis apparatus; and
a mode selecting unit configured to convert a mode of the main body into an analysis mode.

15. The apparatus of claim 14, wherein:
the analysis mode includes a practice mode measuring a driving distance of the golf ball, a target mode setting a target driving distance of the golf ball and analyzing a swing, and a random mode randomly setting a target driving distance of the golf ball and analyzing a swing.

16. A method of analyzing a golf swing, comprising:
radiating a transmission wave to a golf club and a golf ball and detecting a reflected wave, in which a first reflected wave of the golf club and a second reflected wave of the golf ball are mixed, and detecting a frequency deviation between the transmission wave and the mixed reflected wave and generating an output signal;
calculating a speed of the golf club based on a signal, which is generated from the output signal in a time domain; and
calculating a speed of the golf ball hit by the golf club, based on a signal, which is obtained by converting the output signal into a frequency domain, and
wherein: the swing analysis information calculating unit further includes a practice swing determining unit, which determines a swing as a hitting swing when the candidate speed of the golf ball has a predetermined value or more, and determines a swing as a practice swing when the candidate speed of the golf ball has less than the predetermined value, and
wherein: the practice swing determining unit differently applies the predetermined value based on the kind of golf club.

17. The method of claim 16, wherein:
the calculating of the speed of the golf club includes:
generating a signal for a zero-crossing frequency of the output signal;
filtering a signal for the zero-crossing frequency;
detecting a peak of the filtered signal; and
calculating the speed of the golf club based on a frequency value corresponding to the peak.

18. The method of claim 17, wherein:
a point having the largest frequency value in the filtered signal is detected as the peak.

19. The method of claim 16, wherein:
the calculating of the speed of the golf ball includes:
converting the output signal into a frequency domain and obtaining a frequency component;
extracting a first frequency component having the highest frequency value from the frequency components;
calculating a candidate speed of the golf ball based on a frequency value of the first frequency component.

20. The method of claim 19, wherein:
the frequency component having the largest frequency value among the frequency components, of which size values are a predetermined value or more, is extracted as the first frequency component.

* * * * *